(12) United States Patent
Bannon et al.

(10) Patent No.: US 7,296,970 B2
(45) Date of Patent: Nov. 20, 2007

(54) RAM AIR TURBINE SPEED SENSING BALL DETENT OVER-SPEED PREVENTION MECHANISM

(75) Inventors: David G. Bannon, Rockford, IL (US); William E. Seidel, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 341 days.

(21) Appl. No.: 11/148,040

(22) Filed: Jun. 8, 2005

(65) Prior Publication Data

US 2006/0280603 A1    Dec. 14, 2006

(51) Int. Cl.
B64C 11/00  (2006.01)
B64C 27/00  (2006.01)
(52) U.S. Cl. .......................................... 416/44; 416/51
(58) Field of Classification Search .............. 415/30, 415/33, 34, 13; 416/44, 51, 45, 46
See application file for complete search history.

(56) References Cited

U.S. PATENT DOCUMENTS 2,685,932 A * 8/1954 Hartel .......................... 416/37
4,743,163 A   5/1988 Markunas et al.

FOREIGN PATENT DOCUMENTS

GB       2072271 A  *  9/1981

* cited by examiner

*Primary Examiner*—Edward K. Look
*Assistant Examiner*—Dwayne J White
(74) *Attorney, Agent, or Firm*—Stephen G. Mican

(57) ABSTRACT

A ram air turbine (RAT) prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism.

28 Claims, 1 Drawing Sheet

RAM AIR TURBINE SPEED SENSING BALL DETENT OVER-SPEED PREVENTION MECHANISM

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power, or both in the case of a hybrid RAT.

As described in Markunas et al., the turbine includes a speed governor that changes the turbine blade position to maintain a relatively constant shaft speed to the power generating equipment. Failure of the turbine speed governor can cause an over-speed condition that may ultimately cause the release of a turbine blade at very high speed. Due to the high speed, the wayward blade has very high energy as well. The most common cause of governor failure is due to seizure of the bearing between the turbine shaft and the governor yoke plate that controls the pitch of the turbine blades.

The potential release of a high-energy blade proximate the aircraft is a concern for both commercial and military RAT applications. Should the wayward blade strike the aircraft fuselage, it may penetrate the skin and cause damage to electric or hydraulic power equipment or control systems. It may also injure passengers or crew. If one of the propulsion engines ingests the wayward blade, the engine may suffer severe damage that results in loss of thrust.

Current methods to minimise hazards caused by turbine over-speed-induced release of a turbine blade have involved strategic placement of key elements or shields to prevent penetration. These methods no longer satisfy increasingly stringent certification and safety requirements promoted by airworthiness authorities.

SUMMARY OF THE INVENTION

The invention comprises a RAT that prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism.

In a preferred embodiment, the invention comprises an improved ram air turbine (RAT) for generating emergency aeronautical supplemental power that has a governor for automatically adjusting the pitch of turbine blades rotatingly attached to a RAT turbine hub with an axis of rotation and coupled to a governor mechanism by way of cam plate and respective cam follower pins, comprising: a centrifugally operated trigger mechanism attached to the turbine hub responsive to an over-speed condition of the turbine hub; and a release mechanism responsive to the trigger mechanism that frees the turbine blades from the governor mechanism by separating the cam follower plate from the cam follower pins to let them assume a fixed coarse pitch condition.

DETAILED DESCRIPTION OF THE INVENTION

Figure 1:
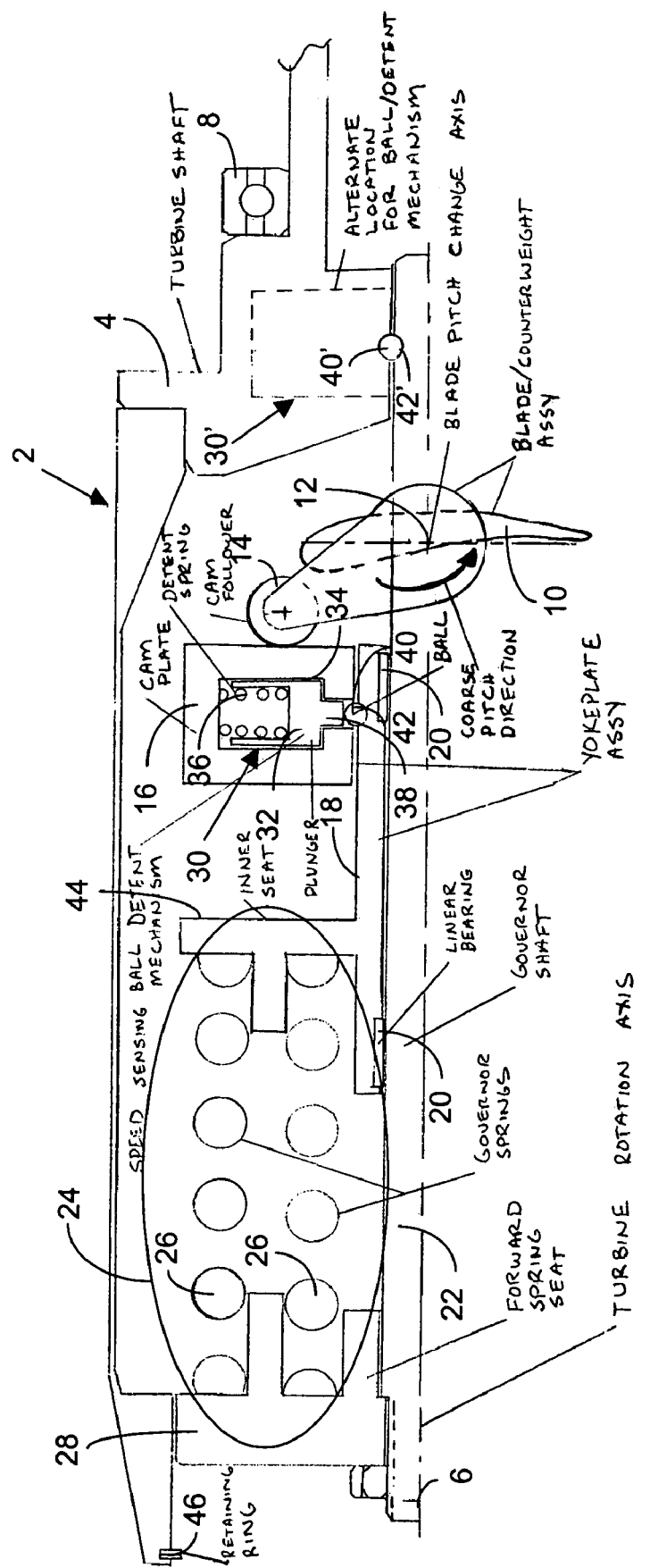
FIG. 1 is a sectional cut-away side view of a RAT that incorporates the invention.

As described in Markunas et al., during normal operation RAT speed is controlled with a counterweight/spring governor balance system. As speed increases the centrifugal torque of a blade/counterweight assembly increases. This torque acts through a cam follower and yoke plate slidingly supported by a turbine shaft to compress a helical spring and thus change the position of the yoke plate. The blades move to a coarser angle with movement of the yoke plate and thus extract less power from the air stream. In this way, the turbine speed is controlled over a range of airspeeds, altitudes and loads.

Such a mechanical governor system requires a translation of rotary motion about the axis of the turbine blade due to the blade/counterweight assembly turning about the blade pitch change axis to axial motion along the turbine shaft such that the force balance with the helical spring can be affected. The translation occurs by means of a roller bearing on the counterweight assembly that engages a bearing surface on the yoke plate. The yoke plate in turn engages the turbine shaft with a linear bearing to slide along the turbine shaft, so that low-friction translation is obtained. Unfortunately, seizure of this linear bearing sometimes occurs and such seizure tends to lock the blades at or near the fine pitch position. In this position, the turbine is most susceptible to over-speed. The invention dramatically reduces the likelihood of over-speed-induced release of a turbine blade due to such a failure of the mechanical governor system.

FIG. 1 is a sectional cut-away side view of a portion of a turbine hub 2 for a RAT that incorporates this invention. The turbine hub 2 has turbine shaft 4 with a turbine shaft axis of rotation 6 that is supported by at least a bearing assembly 8. Turbine blade/counterweight assemblies 10 rotatingly attached to the turbine hub 2 by bearing assemblies (not shown) are free to rotate about a turbine blade axis of rotation 12 that is generally perpendicular to the turbine shaft axis of rotation 6.

At start-up, the turbine blade/counterweight assemblies 10 maintain a fine pitch position. An air stream generally parallel to the turbine shaft axis 6 due to motion of the RAT causes the turbine blade/counterweight assemblies 10 to revolve about the turbine shaft axis 6. Resulting centrifugal twisting moments (CTMs) on the turbine blade/counterweight assemblies 10 due to the air stream and centrifugal counterweight forces cause them to start to rotate toward a coarse pitch position. Relative to the turbine axis 6, rotary motion of the turbine blade/counterweight assemblies 10 rotatingly attached to the turbine hub 2 translates to axial motion through cam follower or op pins 14 riding on a cam plate 16. The cam plate 16 normally attaches to a governor yoke plate 18. Linear bearings 20 provide an axial freedom of movement of the yoke plate 18 along a governor shaft 22 that has a common axis of rotation with the turbine shaft axis 6. As the yoke plate 18 moves axially in response to the change of position of the cam follower pins 14, the yoke plate 18 compresses a governor spring assembly 24.

As the yoke plate 18 compresses the governor spring assembly 24, the governor spring assembly 24 exerts an increasing force that opposes the force applied to the yoke plate 18 by the turbine blade/counterweight assemblies 10. The yoke plate 18 changes the pitch of the turbine blade/counterweight assemblies 10 to be more coarse as it moves axially toward the governor spring assembly 24, thereby reducing the force of the turbine blade/counterweight assemblies 10, thereby bringing about a force equilibrium that ultimately controls turbine speed. Although the governor spring assembly 24 comprises two nested helical springs 26 held between the yolk plate 18 and a forward spring seat 28 attached to the governor shaft 22 in FIG. 1, any number of helical springs, or alternatively, other axial spring designs such as disc (Belleville) springs, may be used.

According to a first embodiment of the invention, at least one centrifugal plunger assembly 30, and preferably a pair or more of opposed centrifugal plunger assemblies 30 to provide dynamic balance, mount within or about the cam plate 16. Each centrifugal plunger assembly 30 comprises at least a centrifugal plunger 32, a plunger cylinder 34 and a compression plunger bias spring 36. One end of the plunger 32 captivates the plunger bias spring 36 within the plunger cylinder 34. The plunger cylinder 34 is aligned within or about the cam plate 16 so that the plunger 32 has a radial freedom of movement relative to the turbine axis 6. The plunger cylinder 34 may be a cavity within the cam plate 16 as shown in FIG. 1, or alternatively may be an independent unit mounted within or about the cam plate 16.

When the turbine hub 2 operates no greater than its normal operating speed, for each plunger assembly 30 the plunger bias spring 36 holds a free end 38 of the plunger 32 against a ball 40 that sits in a detent 42 along the yoke plate 18. In this embodiment of the invention, the cam plate 16 is rigidly coupled to the yoke plate 18 by way of this ball-detent interface. When the turbine hub 2 exceeds its normal operating speed, the centrifugal force of the plunger 32 radially away from the turbine shaft axis 6 starts to exceed the force of the plunger bias spring 36 against the plunger 32. As a result, for each centrifugal plunger assembly 30 the plunger 32 starts to displace radially outwardly in the plunger cylinder 34 away from the turbine shaft axis 6, thereby creating a gap between the plunger free end 38 and the adjacent ball 40. The centrifugal plunger assemblies 30 thereby act as a centrifugal trigger mechanism.

Each ball 40 then moves out of its respective detent 42 due to centrifugal force on it combined with the axial force exerted by the cam follower pins 14 on the cam plate 16, thus removing the ball-detent coupling of the cam plate 16 to the yoke plate 18. The balls 40 and detents 42 thus act as a release mechanism that is activated by the centrifugal trigger mechanism that comprises the centrifugal plunger assemblies 30. In this way, even if the linear bearings 20 are frozen such that the yoke plate 18 is not free to move along the governor shaft 22, the cam plate 16 is now free to move axially along the yoke plate 18 until it makes contact with an inner seat 44 of the yoke plate 18, thereby letting the turbine blade/counterweight assemblies 12 assume a coarse position that slows down the turbine hub 2 to a safe operating speed.

In an alternative embodiment of the invention, the centrifugal plunger assemblies 30 may be mounted within or about the turbine shaft 4, indicated in dashed line as 30'. In this case, the balls 40' are held in detents 42' in the governor shaft 22, so that the governor shaft 22 is rigidly coupled to the turbine shaft 4 by way of this ball-detent interface. When the turbine hub 2 exceeds its normal operating speed, for each centrifugal plunger assembly 30 the centrifugal force of the plunger 32 radially away from the turbine shaft axis 6 starts to exceed the force of the plunger bias spring 36 against the plunger 32. As a result, the plunger 32 starts to displace radially outwardly in the plunger cylinder 34 away from the turbine shaft axis 6, thereby creating a gap between the plunger free end 38 and the adjacent ball 40'. The centrifugal plunger assemblies 30' thereby act as a centrifugal trigger mechanism.

Each ball 40' then moves out of its respective detent 42' due to centrifugal force on it combined with the axial force exerted by the cam follower pins 14 on the cam plate, thus removing the ball-detent coupling of the cam plate 16 to the yoke plate 18. The balls 38' and detents 40' thus act as a release mechanism that is activated by the centrifugal trigger mechanism that comprises the centrifugal plunger assemblies 30. In this way, even if the linear bearings 20 are frozen such that the yoke plate 18 is not free to move along the governor shaft 22, the governor shaft 22 is now free to move axially with respect to the turbine shaft 4 until the forward spring seat 28 attached to the governor shaft 22 makes contact with a retaining ring 46 attached to the turbine shaft 4, thereby letting the turbine blade/counterweight assemblies 12 assume a coarse position that slows down the turbine hub 2 to a safe operating speed.

The invention as described above comprises a RAT that prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism. It should be understood that this embodiment is only an illustrative implementation of the invention, that the various parts and arrangement thereof may be changed or substituted, and that the invention is only limited by the scope of the attached claims.

What is claimed is:

1. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism by way of cam plate and respective cam follower pins, comprising:
   a centrifugally operated trigger mechanism attached to the turbine hub responsive to an over-speed condition of the turbine hub; and
   a release mechanism responsive to the trigger mechanism that frees the turbine blades from the governor mechanism by separating the cam follower plate from the cam follower pins to let them assume a fixed coarse pitch condition.

2. The RAT of claim 1, wherein the centrifugally operated trigger mechanism comprises at least one centrifugal plunger assembly mounted within the turbine hub with a plunger that shifts position radially from the axis of the turbine hub when the RAT exceeds normal operating speed to activate the release mechanism.

3. The RAT of claim 2, wherein the centrifugally operated trigger mechanism comprises a pair of opposed centrifugal plunger assemblies.

4. The RAT of claim 2, wherein each centrifugally operated plunger assembly comprises a compression plunger spring coupled to a plunger that moves radially outwardly from the turbine hub axis when its centrifugal force exceeds a preload bias force of the plunger spring as the RAT exceeds its normal speed of operation.

5. The RAT of claim 2, wherein the release mechanism comprises at least one ball detent mechanism that axially positions the cam plate within the turbine hub with a ball held in place by one end of a corresponding one of the centrifugal plunger assembly plungers, wherein the plunger releases the ball from its position in the ball detent mechanism to release the cam plate from its axial position when the RAT exceeds its normal speed of operation.

6. The RAT of claim 5, wherein the ball for each ball detent mechanism sits in a detent along a yoke plate for the governor mechanism.

7. The RAT of claim 5, wherein each centrifugal plunger assembly mounts within the cam plate.

8. The RAT of claim 5, wherein each centrifugal plunger assembly mounts about the cam plate.

9. The RAT of claim 5, wherein the ball for each ball detent mechanism sits in a detent along a governor shaft for the governor mechanism.

10. The RAT of claim 5, wherein each centrifugal plunger assembly mounts within a turbine shaft for the turbine hub.

11. The RAT of claim 5, wherein each centrifugal plunger assembly mounts about a turbine shaft for the turbine hub.

12. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism by way of cam plate and respective cam follower pins, comprising:
 a centrifugally operated trigger mechanism comprising at least one centrifugal plunger assembly mounted within the turbine hub with a plunger that shifts position radially from the axis of the turbine hub when the RAT exceeds normal operating speed; and
 a release mechanism that frees the turbine blades from the governor mechanism by separating the cam follower plate from the cam follower pins to let them assume a fixed coarse pitch condition responsive to the trigger mechanism, comprising at least one ball detent mechanism that axially positions the cam plate within the turbine hub with a ball held in place by one end of a corresponding one of the centrifugal plunger assembly plungers, wherein the plunger for the centrifugal operated trigger mechanism releases the ball from its position in the ball detent mechanism to release the cam plate from its axial position when the RAT exceeds its normal speed of operation.

13. The RAT of claim 12, wherein the centrifugally operated trigger mechanism comprises a pair of opposed centrifugal plunger assemblies.

14. The RAT of claim 12, wherein each centrifugally operated plunger assembly comprises a compression plunger spring coupled to a plunger that moves radially outwardly from the turbine hub axis when its centrifugal force exceeds a preload bias force of the plunger spring as the RAT exceeds its normal speed of operation.

15. The RAT of claim 12, wherein the ball for each ball detent mechanism sits in a detent along a yoke plate for the governor mechanism.

16. The RAT of claim 12, wherein each centrifugal plunger assembly mounts within the cam plate.

17. The RAT of claim 12, wherein each centrifugal plunger assembly mounts about the cam plate.

18. The RAT of claim 12, wherein the ball for each ball detent mechanism sits in a detent along a governor shaft for the governor mechanism.

19. The RAT of claim 12, wherein each centrifugal plunger assembly mounts within a turbine shaft for the turbine hub.

20. The RAT of claim 12, wherein each centrifugal plunger assembly mounts about a turbine shaft for the turbine hub.

21. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism by way of cam plate and respective cam follower pins, comprising:
 a centrifugally operated trigger mechanism comprising at least one centrifugal plunger assembly mounted within the turbine hub with a plunger that shifts position radially from the axis of the turbine hub when the RAT exceeds normal operating speed; and
 a release mechanism responsive to the trigger mechanism that frees the turbine blades from the governor mechanism by separating the cam follower plate from the cam follower pins to let them assume a fixed coarse pitch condition, comprising at least one ball detent mechanism that axially positions the cam plate within the turbine hub with a ball sitting in a detent along a yoke plate for the governor mechanism held in place by one end of a corresponding one of the centrifugal plunger assembly plungers, wherein the plunger for the centrifugal operated trigger mechanism releases the ball from its position in the ball detent mechanism to release the cam plate from its axial position when the RAT exceeds its normal speed of operation.

22. The RAT of claim 21, wherein the centrifugally operated trigger mechanism comprises a pair of opposed centrifugal plunger assemblies.

23. The RAT of claim 21, wherein each centrifugally operated plunger assembly comprises a compression plunger spring coupled to a plunger that moves radially outwardly from the turbine hub axis when its centrifugal force exceeds a preload bias force of the plunger spring as the RAT exceeds its normal speed of operation.

24. The RAT of claim 21, wherein each centrifugal plunger assembly mounts within the cam plate.

25. The RAT of claim 21, wherein each centrifugal plunger assembly mounts about the cam plate.

26. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism by way of cam plate and respective cam follower pins, comprising:
 a centrifugally operated trigger mechanism comprising at least one centrifugal plunger assembly mounted within the turbine hub with a plunger that shifts position radially from the axis of the turbine hub when the RAT exceeds normal operating speed; and
 a release mechanism responsive to the trigger mechanism for freeing the turbine blades from the governor mechanism by separating the cam follower plate from the cam follower pins to let them assume a fixed coarse pitch condition comprising at least one ball detent mechanism that axially positions the cam plate within the turbine hub with a ball sitting in a detent along a governor shaft for the governor mechanism held in place by one end of a corresponding one of the centrifugal plunger assembly plungers, wherein the plunger for the centrifugal operated trigger mechanism releases the ball from its position in the ball detent mechanism to release the cam plate from its axial position when the RAT exceeds its normal speed of operation.

27. The RAT of claim 26, wherein each centrifugal plunger assembly mounts within a turbine shaft for the turbine hub.

28. The RAT of claim 26, wherein each centrifugal plunger assembly mounts about a turbine shaft for the turbine hub.

* * * * *